June 29, 1926.
M. L. LEE
1,590,633
BREAD AND PASTRY IMPLEMENT
Filed March 27, 1926
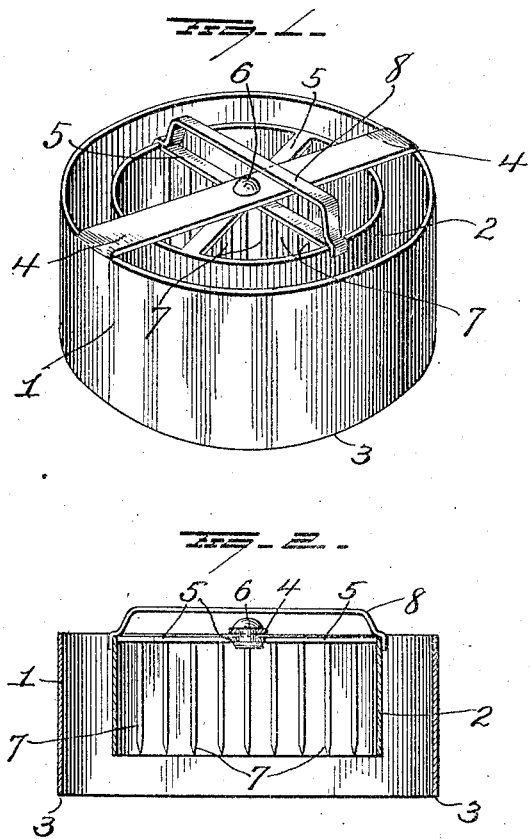

Patented June 29, 1926.

1,590,633

UNITED STATES PATENT OFFICE.

MARY L. LEE, OF LOUISVILLE, KENTUCKY.

BREAD AND PASTRY IMPLEMENT.

Application filed March 27, 1926. Serial No. 97,890.

This invention relates to improvements in bread and pastry implements and more particularly to an implement for making patty shells.

An object of my invention is to provide a device with the use of which the making or cutting of patty shells shall be facilitated and to so construct the device that it may be easily and quickly manipulated to effectually form a patty shell.

With this and other objects in view, the invention consists in certain novel features of construction and combinations of parts as hereinafter set forth and pointed out in the claims.

In the accompanying drawings,—

Figure 1 is a perspective view of an implement illustrating an embodiment of my invention, and Figure 2 is a sectional view.

The implement comprises an outer cutting member 1 and an inner rotatable cutting member 2, the latter having less depth than the former. The outer member 1 may consist of an annular band of sheet metal with a lower cutting edge 3, said band or outer member having sufficient depth or width to permit the same to form and sever a section of bread or pastry from a mass thereof.

A cross-bar 4 is secured at its ends to diametrically opposite portions of the outer member 1 and serves as a support for the inner member 2. The inner member 2 is of less depth than the outer member so that it will not completely penetrate the piece of bread or pastry and is made appreciably smaller than the outer member 1 so that a considerable space intervenes between said members. The inner member 2 has secured to its upper edge, a frame 5 which may be conveniently formed by crossed-bars and this frame is revolubly mounted on a headed stud or screw 6 carried by the cross-bar 4 or the inner member 2 may be pivotally or revolubly supported from said cross-bar 4 in any other suitable manner. Depending teeth 7 are arranged by the cross-bars comprising comprising the frame 5 and these teeth have a length approximately equal to the depth of the inner cutter member 2. A suitable knob or handle 8 may be provided to facilitate the turning of the inner member of the device.

In making a patty shell, the device will be pressed gradually into the bread or pastry so that the outer member will give the external configuration and the inner member will only partially penetrate the bread or pastry. The user will then turn the inner member and the teeth carried thereby will crumble the central portion of the bread or pastry so that it may be readily removed after withdrawal of the device, to form the cavity usually found in patty shells.

Having fully described my invention what I claim as new and desire to secure by Letters-Patent, is:—

1. A device of the character described, comprising an outer cutter member, an inner cutter member of less depth than the outer cutter member and mounted to turn, and agitating means carried by said inner member.

2. A device of the character described, comprising an outer cutter member, an inner cutter member of less depth than the outer cutter member and mounted to turn, and teeth carried by and located within said inner member.

3. A device of the character described, comprising an outer cutter member, an inner cutter member having less depth than that of the outer cutter member, said inner cutter member including a frame rigid therewith and mounted to turn within the outer cutter member, and teeth depending from said frame within the inner cutter member.

In testimony whereof, I have signed this specification.

MARY L. LEE.